(12) United States Patent
Yoon et al.

(10) Patent No.: US 9,465,447 B2
(45) Date of Patent: Oct. 11, 2016

(54) DISPLAY APPARATUS, UI DISPLAY METHOD THEREOF AND COMPUTER-READABLE RECORDING MEDIUM

(71) Applicant: SAMSUNG ELECTRONICS CO., LTD., Suwon-si (KR)

(72) Inventors: Yeo-ri Yoon, Cheongju-si (KR); Dae-Hyun Kim, Busan (KR); Han-soo Kim, Seongnam-si (KR); Chang-soo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 172 days.

(21) Appl. No.: 14/104,598

(22) Filed: Dec. 12, 2013

(65) Prior Publication Data
US 2014/0195985 A1    Jul. 10, 2014

(30) Foreign Application Priority Data
Jan. 7, 2013  (KR) .................. 10-2013-0001759

(51) Int. Cl.
*G06F 3/048* (2013.01)
*G06F 3/023* (2006.01)
*G06F 17/24* (2006.01)
*G06F 3/0488* (2013.01)

(52) U.S. Cl.
CPC ......... *G06F 3/0236* (2013.01); *G06F 3/04886* (2013.01); *G06F 17/24* (2013.01)

(58) Field of Classification Search
CPC ............. G06F 3/04812; G06F 3/0488; G06F 3/04842; G06F 3/0486

USPC .......................................................... 715/856
See application file for complete search history.

(56) References Cited

U.S. PATENT DOCUMENTS

| | | | | |
|---|---|---|---|---|
| 6,583,798 | B1* | 6/2003 | Hoek ...................... | G06F 17/24 715/210 |
| 6,822,585 | B1* | 11/2004 | Ni ......................... | G06F 3/0237 341/22 |
| 7,088,345 | B2* | 8/2006 | Robinson et al. ............ | 345/173 |
| 7,107,204 | B1* | 9/2006 | Liu ....................... | G06F 17/273 704/2 |
| 8,996,356 | B1* | 3/2015 | Yang .................... | G06F 3/0237 704/1 |
| 9,223,483 | B2* | 12/2015 | Thorsander ......... | G06F 3/04842 |
| 9,275,025 | B2* | 3/2016 | Mitnick ................. | G06F 17/24 |
| 2004/0139254 | A1 | 7/2004 | Tu et al. | |

(Continued)

FOREIGN PATENT DOCUMENTS

KR    10-2006-0013240 A    2/2006

OTHER PUBLICATIONS

International Search Report dated Dec. 6, 2013 issued in International Application No. PCT/KR2013/006428 (PCT/ISA/210).

(Continued)

*Primary Examiner* — David Phantana Angkool
(74) *Attorney, Agent, or Firm* — Sughrue Mion, PLLC (57) ABSTRACT

A display apparatus which corrects input characters by moving a cursor in word units is provided. The display apparatus includes a communication interface configured to receive a control command for a character input from a control device, a display configured to display characters corresponding to the control command, and a controller configured to control the display to move a cursor in word units when a correction command to correct the displayed characters is received.

22 Claims, 9 Drawing Sheets

(56) References Cited

U.S. PATENT DOCUMENTS

| | | | |
|---|---|---|---|
| 2008/0077406 A1* | 3/2008 | Ganong | G10L 15/22 704/251 |
| 2008/0303793 A1 | 12/2008 | Carroll | |
| 2009/0225041 A1* | 9/2009 | Kida | G06F 3/04886 345/173 |
| 2011/0202836 A1* | 8/2011 | Badger et al. | 715/702 |
| 2012/0013536 A1 | 1/2012 | Vanduyn et al. | |
| 2012/0092564 A1 | 4/2012 | Bae | |
| 2012/0192093 A1* | 7/2012 | Migos et al. | 715/773 |
| 2015/0074125 A1* | 3/2015 | McBrearty et al. | 707/754 |
| 2015/0121285 A1* | 4/2015 | Eleftheriou et al. | 715/773 |
| 2015/0135108 A1* | 5/2015 | Pope et al. | 715/767 |
| 2015/0143255 A1* | 5/2015 | Agrawal et al. | 715/752 |
| 2015/0186351 A1* | 7/2015 | Hicks et al. | 715/732 |
| 2015/0370345 A1* | 12/2015 | VanBlon | G06F 17/276 715/271 |

OTHER PUBLICATIONS

Written Opinion dated Dec. 6, 2013 issued in International Application No. PCT/KR2013/006428 (PCT/ISA/237).

* cited by examiner

DISPLAY APPARATUS, UI DISPLAY METHOD THEREOF AND COMPUTER-READABLE RECORDING MEDIUM

CROSS-REFERENCE TO RELATED APPLICATION

This application claims priority from Korean Patent Application No. 10-2013-0001759, filed on Jan. 7, 2013, in the Korean Intellectual Property Office, the disclosure of which is incorporated herein by reference in its entirety.

BACKGROUND

1. Field

Apparatuses and methods consistent with the exemplary embodiments relate to a display apparatus, a user interface (UI) display method thereof, and a computer-readable recording medium, and more particularly, to a display apparatus which easily corrects input characters by moving a cursor in word units when correcting an input sentence, a UI display method thereof, and a computer-readable recording medium.

2. Description of the Related Art

Display apparatuses are apparatuses configured to display an image signal provided from an external source. Current display apparatuses may support functions such as Internet surfing and receive character input from a user.

Since the character input is received through a device in which a character input unit such as a remote controller is not included, the display apparatus displays an on-screen keypad configured to easily receive the character input from the user on a screen thereof and the user inputs characters through an operation of selecting a character to be input using left/right and up/down buttons on the remote controller.

However, when correction of the input character has to be performed through the above-described process, since the character to be corrected is selected through the moving of a four-directional button in the remote controller, it is difficult to move the cursor to a character region to be corrected. Further, as the input character string is long, it is difficult to select the character to be corrected.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a display apparatus which easily corrects input characters by moving a cursor in word units when correcting an input sentence, a UI display method thereof, and a computer-readable recording medium.

According to an aspect of an exemplary embodiment, there is provided a display apparatus which is configured to be connected to a control device. The display apparatus may include: a communication interface configured to receive a control command for character input from the control device; a display configured to display characters corresponding to the control command; and a controller configured to control the display to move a cursor in word units when a correction command to correct the displayed characters is received.

The display may display a user interface (UI) window including a first region configured to display the characters corresponding to the control command and a second region configured to display an on-screen keypad for character input.

The display may display a selected character in the first region when the character on the on-screen keypad is selected.

The display may display a region which is currently being selected with a highlight and may display a first word of the first region with a highlight when the highlighted region moves to the first region from the second region.

The display may display a region which is currently being selected with a highlight and may move the highlight in word units when a horizontal moving command is received from the control device in a state in which the highlight is displayed in a specific word of the first region.

The display may replace the word displayed with the highlight with input characters when the character input is received in a state in which the highlight is displayed in the specific word of the first region.

The controller may control the display to move the cursor in character units when a selection command is received in a state in which the highlight is displayed in the specific word of the first region.

The on-screen keypad may include a word moving region configured to move the cursor horizontally in word units.

The on-screen keypad may have a QWERTY keyboard layout.

The controller may control the display to move the cursor in word units only when the characters being displayed in the display are more than preset words.

According to another aspect of an exemplary embodiment, there is provided a display apparatus. The display apparatus may include: a user manipulator configured to receive a control command for character input; a display configured to display characters corresponding to the control command; and a controller configured to control the display to move a cursor in word units when a correction command to correct the displayed character is received.

According to another aspect of an exemplary embodiment, there is provided a method of displaying a user interface (UI) of a display apparatus which is connectable to a control device. The method may include: receiving a control command for character input from the control device; displaying characters corresponding to the control command; and moving a cursor in word units when a correction command to correct the displayed characters is received.

The displaying may include displaying a UI window including a first region configured to display the characters corresponding to the control command and a second region configured to display an on-screen keypad for character input.

The displaying may include displaying a selected character in the first region when the character on the on-screen keypad is selected.

The displaying may include displaying a region currently being selected with a highlight and displaying a first word of the first region with a highlight when the highlighted region moves to the first region.

The displaying may include displaying a region currently being selected with a highlight and the moving may include moving a highlight in word units when a horizontal moving command is received from the control device in a state in which the highlight is displayed in a specific word of the first region.

The displaying may include replacing and displaying the selected specific word with input characters when the character input is received in a state in which the specific word of the first region is displayed with the highlight.

The moving may include moving the cursor in character units when a selection command is received in a state in which the specific word of the first region is displayed with the highlight.

The on-screen keypad may include a word moving region configured to move the cursor horizontally in word units.

The on-screen keypad may have a QWERTY keyboard layout.

The moving may include moving the cursor in word units when the characters being displayed are more than preset words and moving the cursor in character units when the characters being displayed are less than a preset number of words.

According to another aspect of an exemplary embodiment, there is provided a computer-readable recording medium including a program for executing a method of displaying a user interface (UI). The method may include: receiving a control command for a character input from a control device; displaying characters corresponding to the control command; and moving a cursor in word units when a correction command to correct the displayed characters is received.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
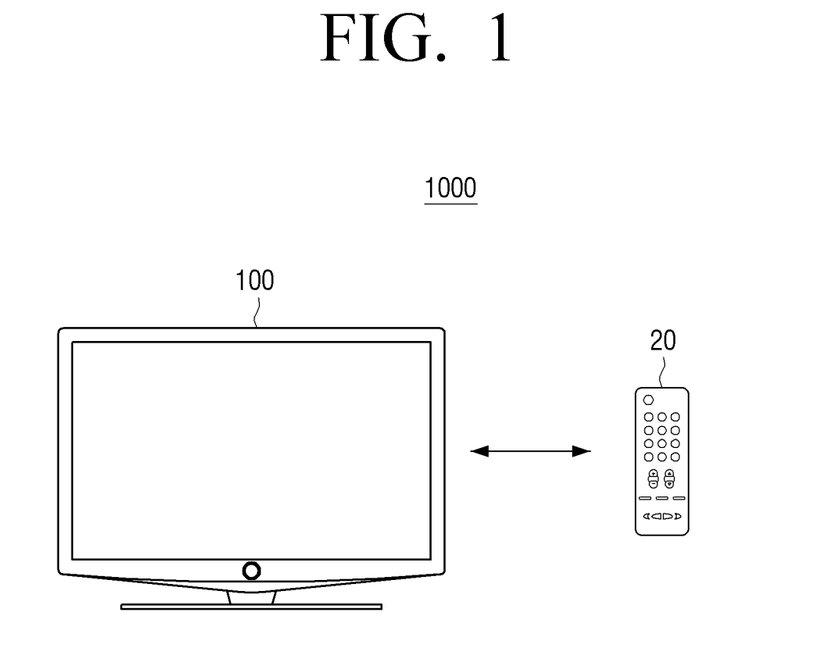
FIG. 1 is a block diagram illustrating a configuration of a display system according to an exemplary embodiment.

FIG. 1 is a block diagram illustrating a configuration of a display system according to an exemplary embodiment.

Referring to FIG. 1, a display system 1000 includes a display apparatus 100 and a control device 20.

The display apparatus 100 is an apparatus configured to provide video information or video/audio information to a user and may be implemented with a monitor, a digital television, and the like. Specifically, the display apparatus 100 displays a UI window for receiving character input in a state in which the character input is necessary.

When a command to correct the input character is received from the control device 20, the display apparatus 100 may move a cursor in word units. When a word to be corrected is selected, the display apparatus 100 may receive characters which may replace the selected word and display the newly received characters other than the selected word. Detailed configuration and operation of the display apparatus 100 will be described later with reference to FIG. 2.

The control device 20 includes a button (specifically, a physical button or a UI button) configured to receive a display control command and provide the received control command to the display apparatus 100 in a wireless or wired manner. The control device 20 may include a general remote controller which does not include a character input unit. Alternatively, the control device 20 may include a device including the character input unit such as a wireless keyboard, a smart phone, an MPEG-1 audio layer 3 (MP3) player, and a portable multimedia player (PMP).

The control device 20 may transmit a horizontal moving command and a vertical moving command to control the cursor (or a highlight) to the display apparatus using the button provided therein and transmit a selection command for selecting a currently selected region to the display apparatus.

In the display system 1000 according to the above-described exemplary embodiment, when the correction command is received from the control device 20, the cursor moves in word units and the user may easily rapidly select a word to be corrected.

On the other hand, the display system has been illustrated and described where the display apparatus 100 is directly connected to the control device 20. However, the display system may be implemented such that the display apparatus 100 is connected to the control device 20 through a relay device such as a router. Further, FIG. 1 has illustrated where the display apparatus 100 is connected to one control device 20. However, the display system may be implemented such that the display apparatus 100 may be connected to a plurality of control devices 20.

Figure 2:
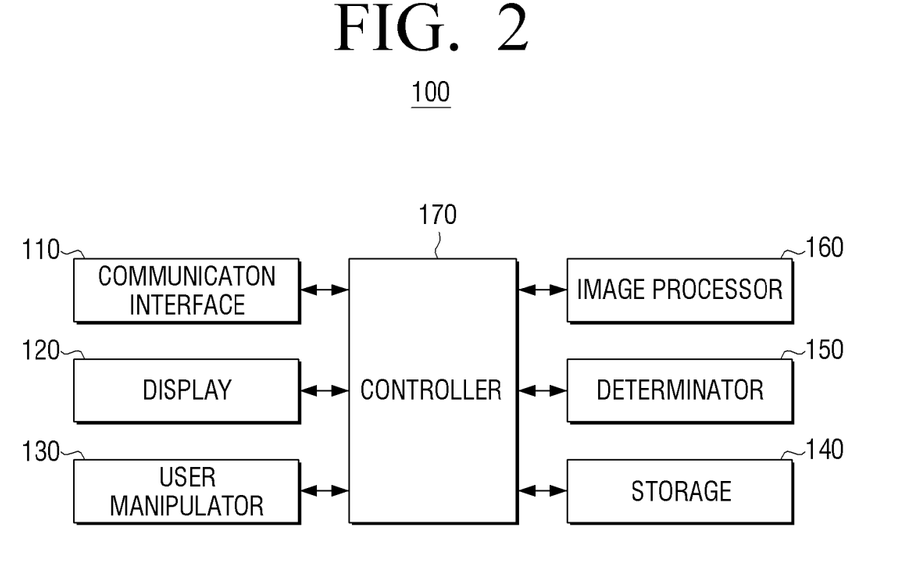
FIG. 2 is a view illustrating a detailed configuration of the display apparatus of FIG. 1.

FIG. 2 is a view illustrating a detailed configuration of the display apparatus 100 of FIG. 1.

Referring to FIG. 2, the display apparatus 100 according to an exemplary embodiment includes a communication interface 110, a display 120, a user manipulator 130, a storage 140, a determinator 150, an image processor 160, and a controller 170.

The communication interface 110 connects the display apparatus 100 to an external apparatus (not shown) and may be connected to the external apparatus through wired connections (for example, universal serial bus (USB) and personal system/2 (PS/2)), a local area network (LAN), and an Internet network, or through a wireless communication (for example, wireless communication such as wireless fidelity (WiFi), Bluetooth, global system for mobile communications (GSM), universal mobile telecommunication system (UMTS), long-term evolution (LTE), and wireless broadband (Wibro)) manner.

The communication interface 110 may perform communication with the control device 20. Specifically, the communication interface 110 may receive device information (for example, a device name, a model name, and presence/absence of a character input unit) of the control device 20 from the control device 20. The communication interface 110 may receive a control command from the control device 20. The control command may include a display command of a UI window for character input, a moving command of a selection region in a state in which the UI window is displayed, a selection command for the selection region, and a keypad command corresponding to a character.

The communication interface 110 receives an image signal. Specifically, the communication interface 110 may receive the image signal from an external image providing apparatus (for example, a settop box and the like). The image signal may be a broadcasting signal transmitted from a broadcasting station or a satellite in a wireless or wired manner. The image signal may be video content transmitted from a digital versatile disk (DVD) player, a blu-ray player, and the like through a high definition multimedia interface (MDMI) cable, an audio/video (AV) terminal, and the like and a video content transmitted from a portable phone, a computer, and the like through a USB terminal.

The communication interface 110 receives a data signal. Specifically, the communication interface 110 may receive a data signal such as an Internet web page and an Internet moving image from an Internet network.

The display 120 may display information provided from the display apparatus 100. The display 120 may include an image display apparatus such as a liquid crystal display (LCD), a plasma display panel (PDP), and a cathode ray tube (CRT).

The display 120 displays an image. Specifically, the display 120 may display the image generated in the image processor 160 to be described later.

The display 120 displays a UI window configured to receive character input. Specifically, when the character input is necessary in the display apparatus 100, for example, when a user's control command such as an Internet search and a content search is received, the display 120 may display the UI window configured to receive the character input. The UI window may include a first region configured to display characters corresponding to the received control command and a second region configured to display an on-screen keypad for the character input.

When the UI window has to be displayed while an image is being displayed, the display 120 may display the UI window on the image being displayed. At this time, the image displayed together with the UI window may be a web page image, a moving image, a television image, and the like. Examples of the specific UI window will be described later with reference to FIGS. 3 and 4.

The exemplary embodiment has been illustrated to display the UI window including a first region and a second region. However, the display may be implemented to display the UI window including only the first region (that is, the UI window not including the second region) when the control device connected thereto is a device including the character input unit.

The display 120 may display a region which is currently being selected by the user with a highlight. A highlighted region may be moved and displayed on the display 120 according to the horizontal moving command or the vertical moving commands of the user. The highlight may be a region which displays a current selection region of the user, that is, a region which displays the selection region of the user other than the cursor when a keypad region of the second region and a word are selected. The highlight may be displayed with other colors different from a surrounding area, or by a flashing cursor.

The display 120 may display a selected character in the first region. Specifically, when a character command (for example, an input command of a character 'a') corresponding to a character is directly received from the control device or when a character on the on-screen keypad is selected according to a manipulation of a direction key, the display 120 may display the received character or the selected character in the first region. At this time, the first region may cumulatively display the selected character. For example, when a character "d" is selected in a state in which "abc" is displayed in the first region, the display 120 may display "abcd" in the first region.

The display 120 may move the highlight in word units. Specifically, when the first region is selected by a cursor (or highlight) moving command of the user, that is, when the highlighted region being displayed in the second region moves to the first region by the control command of the user, the display 120 may display a first word in the first region with the highlight, and may move and display the highlight in word units according to a horizontal moving command of the user.

The exemplary embodiment has described that the first word in the first region is displayed with the highlight when the first region is selected. However, the display 120 may be implemented that the last word of the first region is displayed with a highlight or that a word closest to a position of the last highlight of the second region is displayed with a highlight.

The display 120 may replace the word currently being displayed with the highlight with received characters, and display the received characters when the characters are received in a state where a specific word of the first region is displayed with a highlight. Specifically, when a new character is received after the highlight moves to a word to be corrected by the user, the display 120 may replace the word currently being selected with the newly received characters, and display the newly input characters. For example, the display 120 may display "This is book" in the first region and when a character "a" is received in a state in which a word "book" is displayed with the highlight, the display 120 may display "This is a" in the first region.

The display 120 may release the display of the highlight for a corresponding specific word and display the cursor behind the last character of the specific word when a selection command is received in a state in which the specific word of the first region is displayed with the highlight. The display 120 may move and display the cursor in character units according to the horizontal moving command from the user. Specifically, the display 120 may determine that correction for some characters of the selected word is necessary when the selection command is received from the user after the highlight moves to the word to be corrected by the user. Therefore, the display 120 may display the cursor just behind the selected word and move and display the cursor in character units according to the horizontal moving command of the user.

The display 120 may add and display a received character to a current position of the cursor when the character is received in a state in which the cursor is displayed in a character of the first region. For example, characters "Thi is book" are displayed in the first region, the cursor may be located just behind "Thi" when the user press a selection region in a state in which a highlight is displayed in "Thi", and the first region may display "This is book" when the user inputs a character "s" in the above-described state.

The user manipulator 130 may receive a user's control command. Specifically, the user manipulator 130 may include a plurality of functional keys configured to set or select various functions supported in the display apparatus 100 by the user. The exemplary embodiment has illustrated and described that the display 120 and the user manipulator 130 are separately configured. However, the display 120 and the user manipulator 130 may be implemented with one device in which an input and an output are simultaneously implemented such as a touch screen.

The above-described exemplary embodiment has described that the character input is received from the control device. However, the exemplary embodiment may be implemented such that the character input and correction command described above may be received through the user manipulator 130 provided in the display apparatus 100.

The storage 140 may store contents corresponding to various services supported by the display apparatus 100. The storage 140 stores a program for driving of the display apparatus 100. Specifically, the storage 140 may store the program which is a collection of various commands required for the driving of the display apparatus 100. Here, the program includes an application for providing specific services and an operation program for driving the application.

The storage 140 may store information of the control device including the character input unit. Here, the information of the control device may include a model name, a device name, and the like of the control device including the character input unit. The exemplary embodiment has described that the storage stores the information of the control device including the character input unit. The storage 140 may be implemented to store information of the control device not including the character input unit, and to store information regarding whether or not the character input units for all control devices are provided. The above-described information may be provided from the manufacturer and may be generated by setting of the user.

The storage 140 may include a storage medium in the display apparatus 100 and an external storage medium such as a removable disk including a USB memory, a separate storage medium connected to a host, and a web server through a network.

The determinator 150 determines whether or not the control device includes the character input unit. Specifically, the determinator 150 may determine whether or not the control device which inputs a current control command includes the character input unit such as a QWERTY keyboard based on the information of the control device received through the communication interface 110 and the information of the control device stored in the storage 140. The exemplary embodiment has illustrated that the QWERTY keyboard is exemplified as the character input unit, but other keyboards having different key arrangements from the QWERTY keyboard such as a Hangle 2-set type keyboard, a Hangle 3-set type keyboard, and a Dvorak keyboard may be used.

The determination may be performed when display of a UI window configured to receive first character input is necessary or at a point of time when the control command for character input is input. The determination may be performed in a real time (specifically, every preset period of time).

The image processor 160 processes an image. Specifically, the image processor 160 may perform image processing on an image signal or a data signal received through the communication interface 110 and provide the image-processed image signal to the display 120.

The controller 170 controls each component in the display apparatus 100. Specifically, the controller 170 may control the determinator 150 to determine whether or not the display of the UI window for character input is necessary when the control command is received from the control device 20 and to determine whether or not the control device which inputs the control command includes the character input unit when it is determined that the display of the UI window for character input is necessary.

The controller 170 may control the display 120 to display a first UI window having a first region configured to display characters corresponding to a control command and a second region configured to display an on-screen keypad for character input when it is determined that the control device which inputs the control command does not include the character input unit.

The controller 170 may control the display 120 to display a second UI window not including the second region in the first UI window when it is determined that the control device which inputs the control command includes the character input unit.

The controller 170 may control the display 120 to display a received character when the character is received from the control device in a state in which the UI window is displayed.

The controller 170 may control the display 120 to move the cursor in word units when a correction command for the displayed characters is received from the user, specifically when the first region is selected from the user. Specifically, the controller 170 may control the display 120 to display that the highlight moves in word units when a horizontal moving command is received from the user in a state in which a region being selected moves to the first region. Here, the highlight is a user selection region other than the cursor displayed when moving in word units.

The controller 170 may control the display 120 to move the highlight in word units only when the characters displayed in the first region are more than a preset number of words (or the preset number of characters). Specifically, it is unnecessary to move the highlight in word units when only one word such as "apple" is displayed, and thus the controller 170 may control the display 120 to move the cursor in character units when the characters being displayed in the first region are less than the preset number of words.

In the above-described display apparatus 100 according to an exemplary embodiment, when the correction command for correction of the characters input by the user is received, the cursor moves in word units and therefore the user may easily rapidly select the word to be corrected.

FIG. 2 has illustrated that the determinator 150, the image processor 160, and the controller 170 as being separately configured. However, the determinator 150 and the controller 170 may be implemented as a single component, the image processor 160 and the controller 170 may be implemented as a single component, and the determinator 150, the image processor 160, and the controller 170 may be implemented as a single component.

Figure 3:
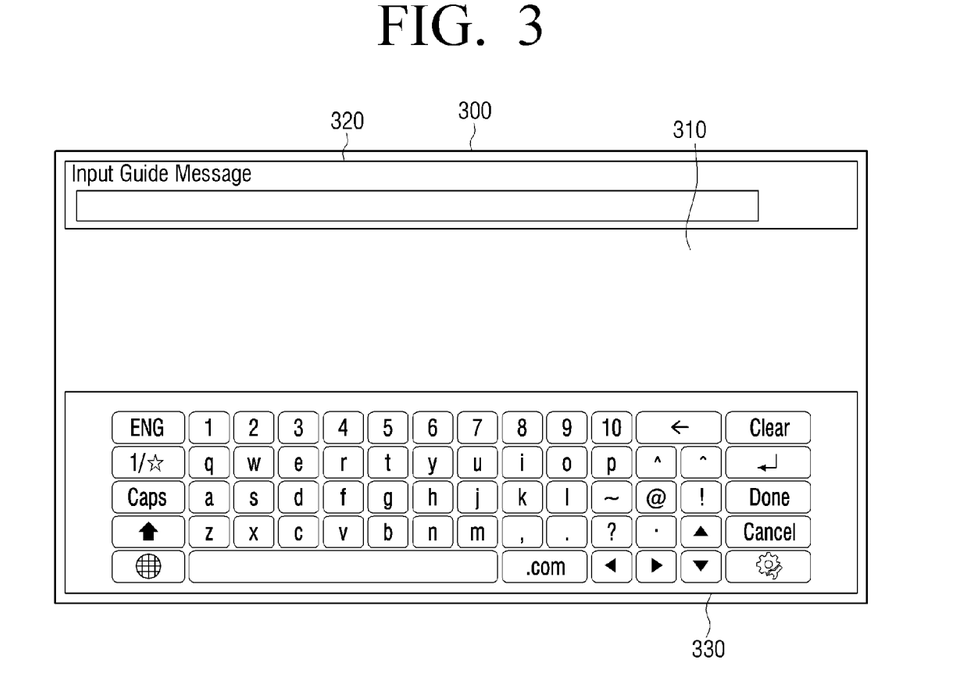
FIGS. 3 and 4 are view illustrating examples of a UI window to be displayable in a display of FIG. 2.
Figure 4:
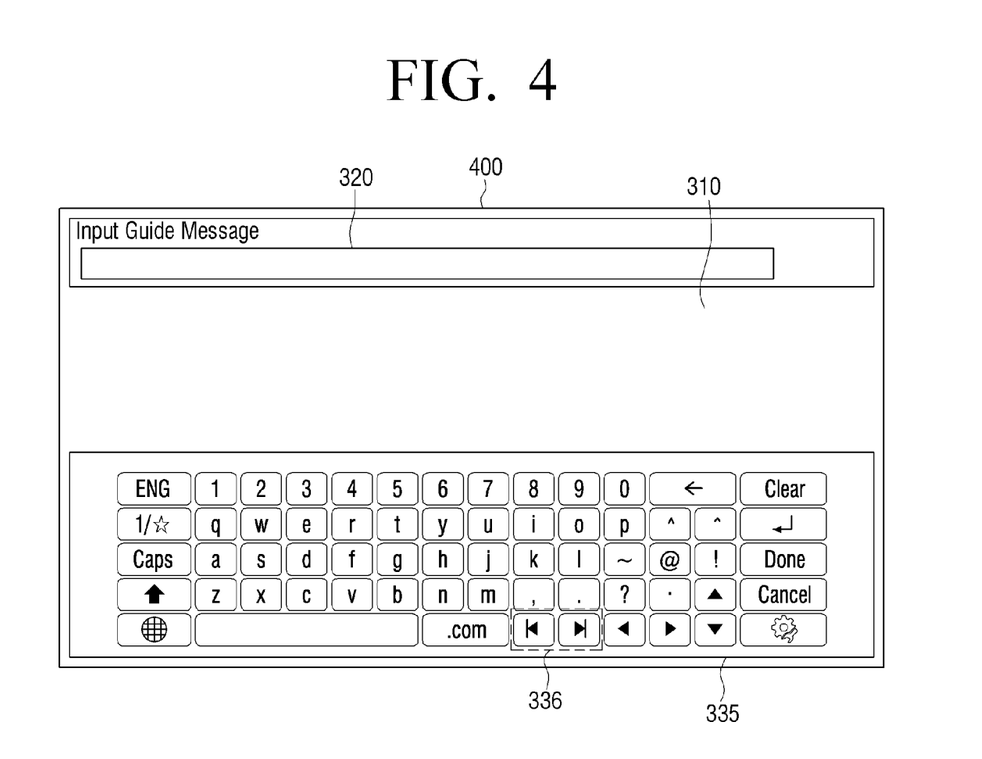

FIGS. 3 and 4 are views illustrating examples of a UI window to be displayable in the display of FIG. 2.

Referring to FIG. 3, a UI window 300 includes a first region 320 and a second region 330, and is displayed on an image region 310. Here, the image region 310 may be a region configured to display an image which is being displayed before the UI window 300 is displayed or a region configured to display a searching result received through the first region 320.

The first region 320 is a region which displays a character corresponding to a control command of the user. Specifically, the first region 320 is a region which displays the character corresponding to a character on a keypad selected by the user on an on-screen keypad.

The second region 330 is a region which displays an on-screen keypad for character input. The on-screen keypad may have a QWERTY keyboard layout. When the user selects an input for a character of a language other than English, the on-screen keypad may display other keyboards such as a Hangle 2-set type keyboard, a Hangle 3-set type keyboard, and the like. The user may input a character to be input by moving a cursor (or highlight) vertically or horizontally on the on-screen keypad displayed in the second region. For example, when the cursor is located on a character "v" on the keypad, and the character to be input is "a", the user may select the character "a" by clicking a left button of the control device three times, clicking an up button of the control device once, and clicking an input button (or a confirm button). When the character "a" is input through the above-described process, the first region 320 may display the input character "a".

The UI window 300 includes an on-screen keypad and the user may easily input the characters through a control device which does not have a the character input unit.

Referring to FIG. 4, a UI window 400 includes a first region 320 and a second region 335 and is displayed on an image region 310. Only the second region 335 of the UI window 400 is different from that of the UI window 300 of FIG. 3 and therefore only the second region 335 will be described below.

The second region 335 is a region configured to display an on-screen keypad for character input. The on-screen keypad may have a QWERTY keyboard layout and include a word moving region 336.

The word moving region 336 is a region configured to receive a command for horizontally moving the cursor region of the first region in word units. The user may select the word moving region 336, and select a word to be corrected among characters being displayed in the first region 320. The operation of the word moving region will be described with reference to FIG. 8.

The configuration of the UI window displayed when display of the UI window for first character input is necessary has been described. Hereinafter, change in the UI window according to character input of the control device and a correction command after the UI window is displayed will be described with reference to FIGS. 5 to 8.

FIGS. 5 to 8 are views illustrating an operation of a display apparatus according to an operation of a control device.

Figure 5:
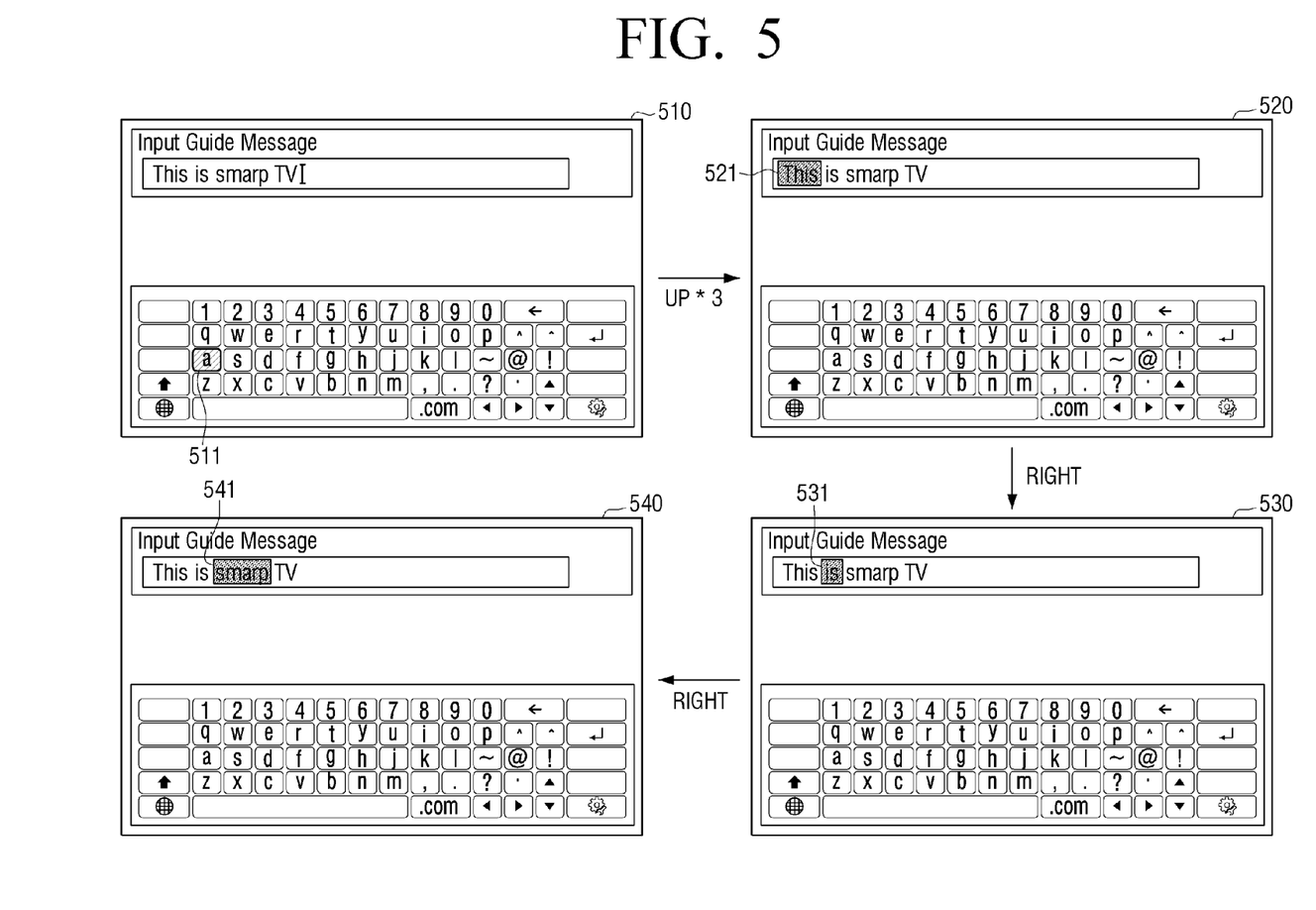
FIGS. 5 to 8 are views illustrating an operation of a display apparatus according to an operation of a control device.

Specifically, FIG. 5 is a view illustrating the change in the UI window when the user inputs a character correction command in a state in which the UI window illustrated in FIG. 3 is displayed.

First, the user sequentially inputs characters "This is smarp TV" through the second region of the UI window as illustrated in FIG. 3. Therefore, a UI window 510 displays the input characters "This is smarp TV" in a first region. Currently, since the user is continuously inputting characters, the cursor region is located in a second region and the cursor on the second region is displayed with a highlight 511 as illustrated in FIG. 5.

In the above-described state, the user confirms that the word "smarp" is wrongly input among the input characters. To correct the wrong word, the user inputs an upward moving command three times to move the cursor from the second region to the first region.

By the cursor moving command, a UI window 520 displays a highlight in a character region 521 corresponding to a first word among characters displayed in the first region.

When the user inputs a right moving command to select a word to be corrected, a UI window 530 displays a highlight in a character region 531 corresponding to a second word among the characters displayed in the first region.

When the user inputs the right moving command again, a UI window 540 displays a highlight in a character region 541 corresponding to a third word among the characters displayed in the first region.

As described above, the user may reach the character region to be corrected by using only two moving commands after moving the highlight to the first region.

The method that the user reaches the word to be corrected has been described. Hereinafter, a correction method for a selected word will be described with reference to FIGS. 6 and 7.

Figure 6:
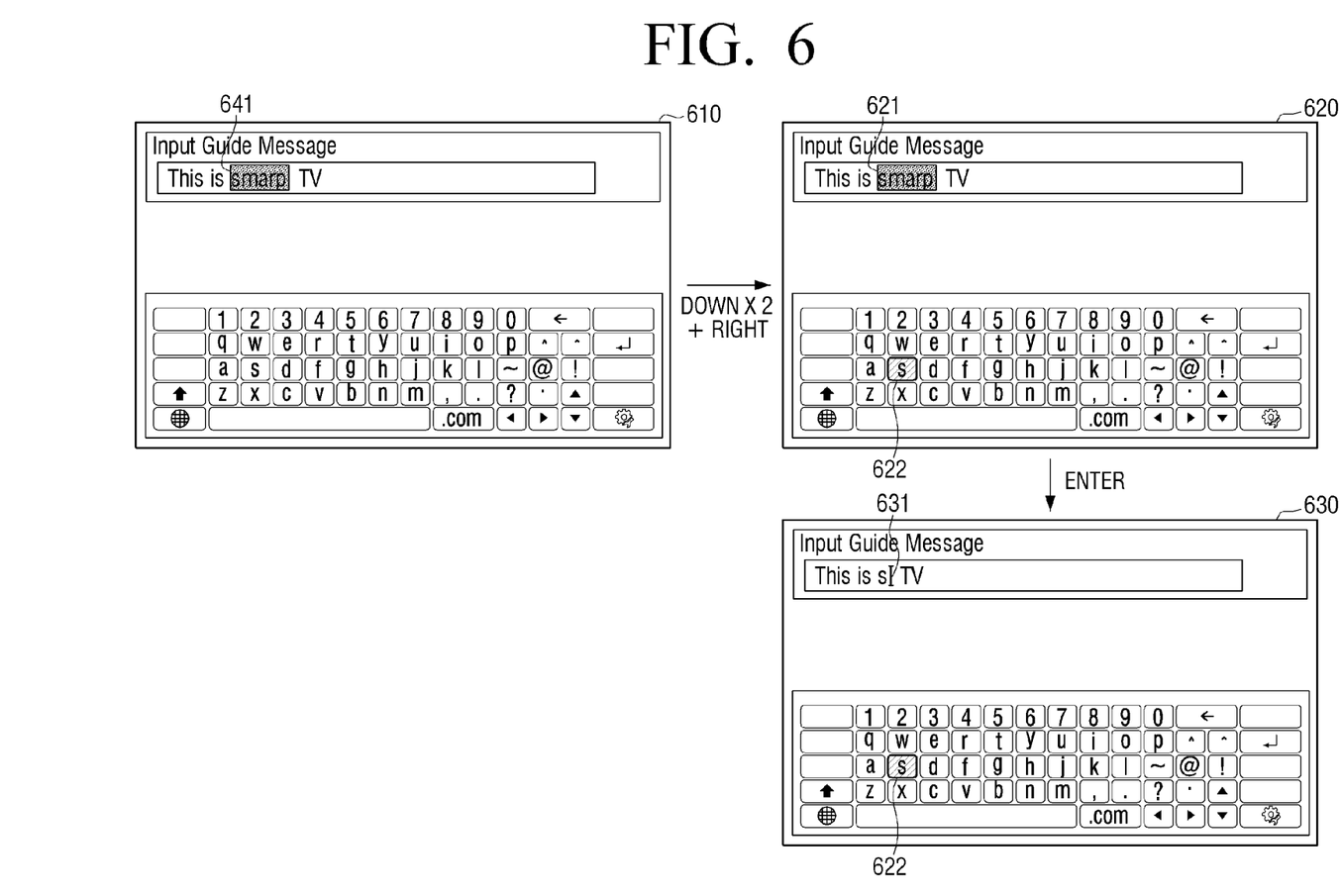

FIG. 6 is a view illustrating a change in a UI window corresponding to a user's character correction command after a word of a first region is selected.

Referring to FIG. 6, the user locates a highlight on a word to be corrected among characters displayed in a first region. Therefore, a UI window 610 displays a highlight in a character region 641 corresponding to a third word which is a word to be corrected by the user among the characters displayed in the first region.

At this time, the user may input a downward moving command twice and input a right moving command once to input a corresponding word again. Accordingly, a UI window 620 displays a character "s" region in the second region corresponding to the user's moving command as a selection region with a highlight in a state in which a highlight is displayed in a character region 621 corresponding to the third word of the first region.

At this time, when the user inputs a selection command, a UI window 630 displays a newly input character "s" in the character region 611 corresponding to the existing third word. Therefore, the UI window 630 displays "This is s TV" in the first region and displays a cursor 631 behind the newly input character "s". The UI window 630 finally displays the selected character "s" region with a highlight.

The user may move the highlight region of the second region and sequentially select characters 'm', 'a', 'r', and 't' regions of the second region. Therefore, the third word of the first region may be replaced with "smart" from "smarp".

The above-described character correction may improve the user's convenience through replacing of the word, but there is an uncomfortable feeling when only one character of a word is necessary to be corrected or when only one character is necessary to be added. Hereinafter, the correction operation for only one character will be described with reference to FIG. 7.

Figure 7:
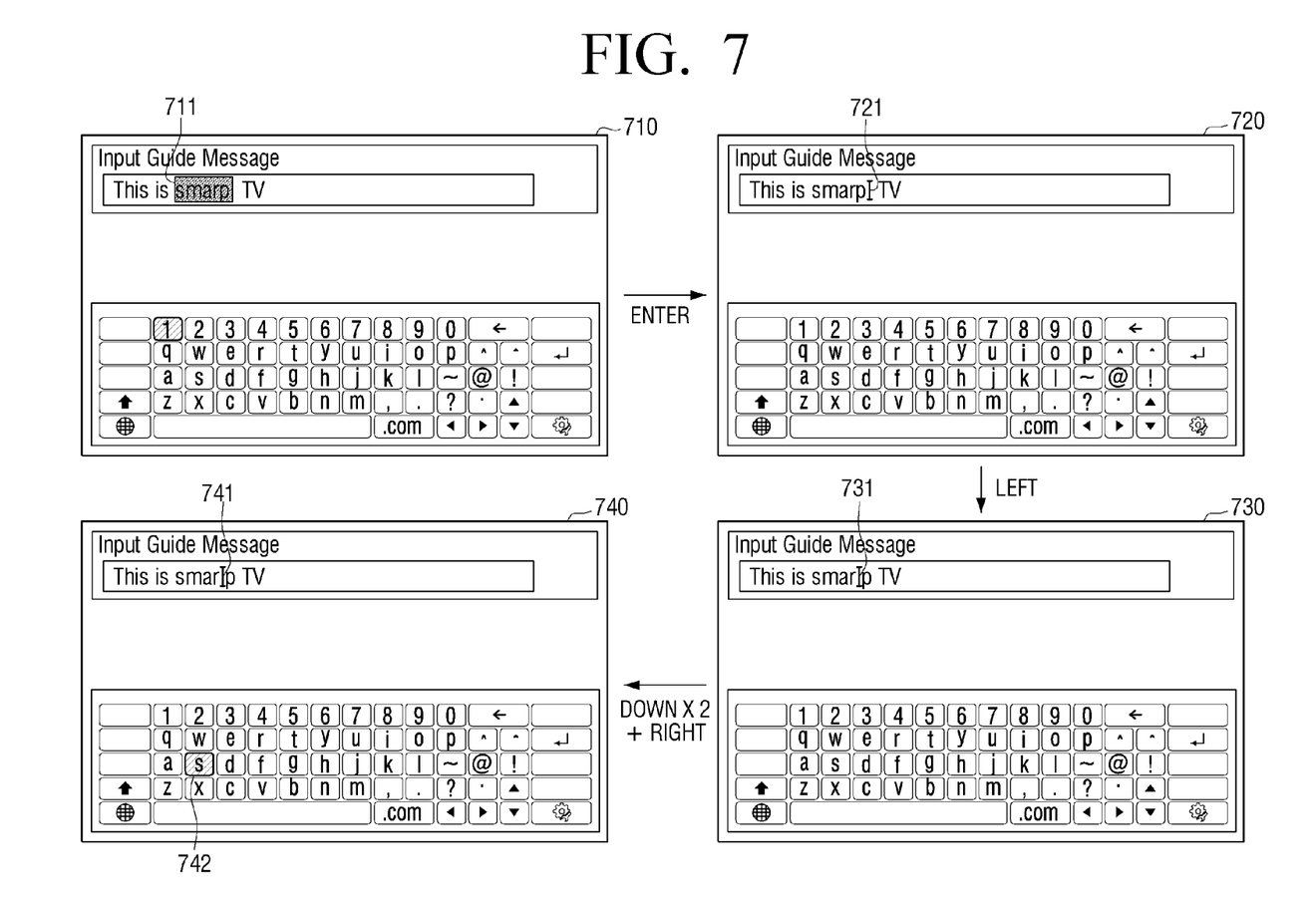

FIG. 7 is a view illustrating change in a UI window corresponding to a user's character correction command after a word of the first region is selected.

Referring to FIG. 7, the user locates a highlight in a word to be corrected among characters displayed in a first region. Therefore, a UI window 710 displays the highlight in a character region 711 corresponding to a third word which is a word to be corrected by the user among the characters displayed in the first region.

At this time, the user inputs a selection command (that is, an "enter" keypad) for the word displayed with the highlight to add a new character to the corresponding word. Therefore, a UI window 720 removes the highlight displayed in the first region and displays a cursor 721 behind the third word.

To move the cursor in a region to which a character is to be added, the user inputs a left moving command once. Therefore, a UI window 730 displays the cursor between characters 'r' and 'p' of the third word of the first region.

The user inputs a downward moving command twice and inputs a right moving command once to input the character to be added. Therefore, a UI window 740 displays a character 's' region of the second region corresponding the user's moving command with a highlight 742 as a selection region.

At this time, when the user inputs a selection command, the UI window 740 displays a newly input character 's' between the characters 'r' and 't' of the existing third word. Therefore, the UI window may display "This is smarst in the first region.

Figure 8:
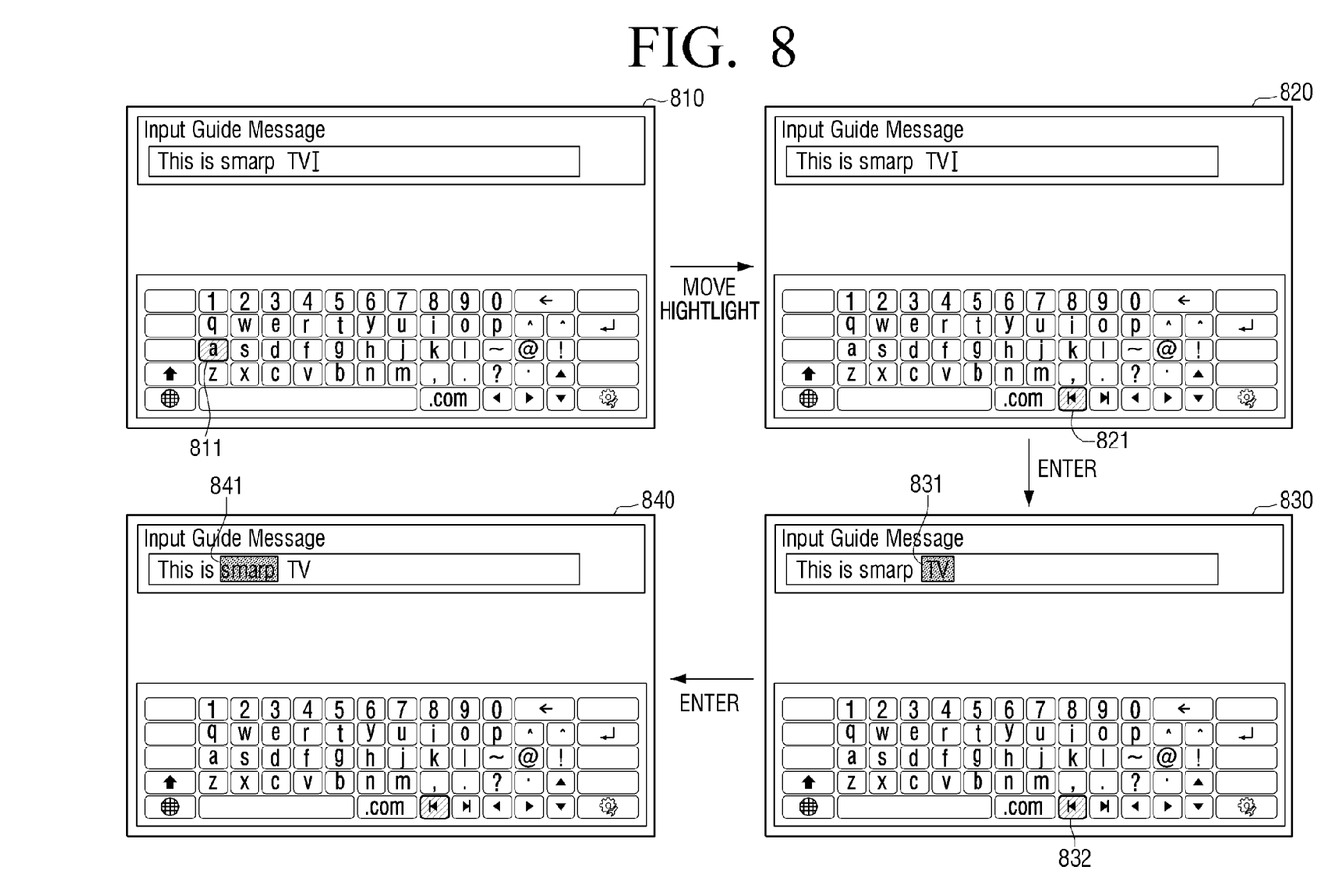

FIG. 8 is a view illustrating change in a UI window when the user inputs a character correction command in a state in which a UI window is displayed.

First, the user inputs sequentially characters "This is smarp TV" through a second region of a UI window as illustrated in FIG. 4. Therefore, a UI window 810 displays the input characters "This is smarp TV" in the first region. Currently, since the user is continuously inputting characters, a cursor region is located on the second region and the cursor on the second region is displayed with a highlight 811 as illustrated in FIG. 8.

In the above-described state, the user may confirm that a word "samarp" among input characters is wrongly input and move a selection region of the second region to a word moving region to correct the wrong word. Therefore, a UI window 820 displays a left word moving region 821 of the word moving region of the second region corresponding to the user's moving command with a highlight as the selection region.

At this time, when the user inputs a selection command, a UI window 830 displays a highlight in a character region 831 corresponding to the last word among characters displayed in the first region.

When the user inputs the selection command again to move the highlight to a word to be corrected, a UI window 840 displays a highlight in a character region 841 corresponding to a third word among the characters displayed in the first region.

When the word to be corrected is selected through the above-described process, the user may perform a correction for the selected word using the method as illustrated in FIG. 6 or FIG. 7.

Figure 9:
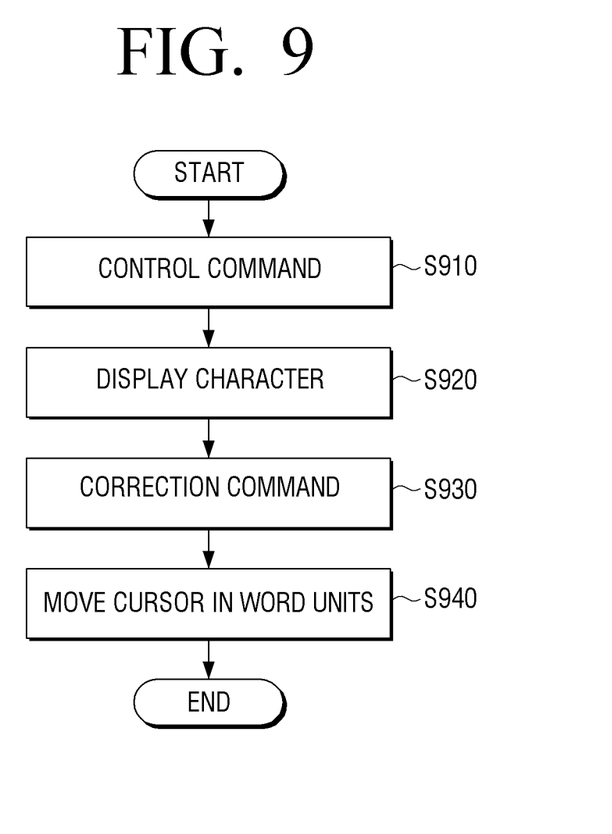
FIG. 9 is a flowchart illustrating a UI display method in a display apparatus according to an exemplary embodiment.

FIG. 9 is a flowchart illustrating a UI display method in a display apparatus according to an exemplary embodiment.

Referring to FIG. 9, first, the display apparatus receives a control command for character input from a control device (operation S910).

The display apparatus displays characters corresponding to the control command (operation S920). Specifically, the display apparatus may display a UI window including a first region configured to display the characters corresponding to the control command and a second region configured to display an on-screen keypad for character input. At this time, the UI window may display a region which is currently being selected by the user with a highlight.

The display apparatus receives a correction command for the displayed characters (operation S930). Specifically, when a region which is currently being selected moves from the second region to the first region, the display apparatus may recognize the correction command for the displayed characters.

When the correction is received, the display apparatus may move a cursor in word units (operation S940). Specifically, when the region which is currently being selected moves from the second region to the first region, the display apparatus may display the highlight in a first word of the first region and may move and display the highlight in word units according to a horizontal moving command of the user.

When a character is received from the user on the cursor-moved word, the display apparatus may change and display a corresponding word to the input word.

The above-described UI display method according to an exemplary embodiment moves the cursor in word units when the correction command is received from the control device, and thus the user may easily and rapidly select the word to be corrected. The UI display method as illustrated in FIG. 9 may be executed on the display apparatus having the configuration of FIG. 2 and on other display apparatuses having other configurations.

The above-described UI display method may be implemented with a program (or application) including an algorithm executable in a computer and the program may be stored and provided in a non-transitory computer-readable medium.

As will be appreciated by one skilled in the art, aspects of the exemplary embodiments may be embodied as an apparatus, system, method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more non-transitory computer readable medium(s) having computer readable program code embodied thereon, and executed by a hardware processor.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

The foregoing exemplary embodiments are merely exemplary and are not to be construed as limiting. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display apparatus which is configured to receive a signal from a control device, the display apparatus comprising:
   a communication interface configured to receive input signals from the control device;
   a display configured to display a sentence comprising a plurality of words corresponding to the received input signal; and
   a controller configured to control the display to move a cursor in word units within the sentence if it is determined that a received input signal is a horizontal moving input signal, and to control the display to replace a word where the cursor is located with input characters if it is determined that the received input signal is a character input signal.

2. The display apparatus as claimed in claim 1, wherein the display displays a user interface (UI) window including a first region configured to display the characters corresponding to the received input signal, and a second region configured to display an on-screen keypad for character input.

3. The display apparatus as claimed in claim 2, wherein the display displays a selected character in the first region when a character on the on-screen keypad is selected.

4. The display apparatus as claimed in claim 2, wherein the display displays a region of one of the first region and the second region which is currently being selected with a highlight and displays a first word of the first region with a highlight when a highlighted region moves to the first region.

5. The display apparatus as claimed in claim 2, wherein the display displays a region of one of the first region and the second region which is currently being selected with a highlight and moves the highlight in word units when the horizontal moving input signal is received from the control device in a state in which the highlight is displayed in a specific word of the first region.

6. The display apparatus as claimed in claim 5, wherein, when an input of characters is received in a state in which the highlight is displayed in the specific word of the first region, the controller controls the display to replace the word displayed with the highlight with input characters.

7. The display apparatus as claimed in claim 5, wherein the controller controls the display to move the cursor in character units when a selection command is received in a state in which the highlight is displayed in the specific word of the first region.

8. The display apparatus as claimed in claim 2, wherein the on-screen keypad comprises a word moving region configured to move the cursor horizontally in word units.

9. The display apparatus as claimed in claim 2, wherein the on-screen keypad has a QWERTY keyboard layout.

10. The display apparatus as claimed in claim 1, wherein the controller controls the display to move the cursor in word units only when the characters being displayed in the display are more than a preset number of words.

11. A display apparatus, comprising:
    a user manipulator configured to receive input signals;
    a display configured to display a sentence comprising a plurality of words corresponding to the received input signals; and
    a controller configured to control the display to move a cursor in word units within the sentence if it is determined that a received input signal is a horizontal moving input signal, and to control the display to replace a word where the cursor is located with input characters if it is determined that the received input signal is a character input signal.

12. A method of displaying a user interface (UI) of a display apparatus which is configured to receive a signal from a control device, the method comprising:
    receiving input signals from the control device;
    displaying a sentence comprising a plurality of words corresponding to the received input signal;
    moving a cursor in word units within the sentence if it is determined that a received input signal is a horizontal moving input signal; and
    replacing a word where the cursor is located with input characters if it is determined that the received input signal is a character input signal.

13. The method as claimed in claim 12, wherein the displaying comprises displaying a UI window including a first region configured to display the characters corresponding to the received input signal, and a second region configured to display an on-screen keypad for character input.

14. The method as claimed in claim 13, wherein the displaying comprises displaying a selected character in the first region when a character on the on-screen keypad is selected.

15. The method as claimed in claim 13, wherein the displaying includes displaying a region of one of the first region and the second region currently being selected with a highlight and displaying a first word of the first region with a highlight when a highlighted region moves to the first region.

16. The method as claimed in claim 13, wherein the displaying includes displaying a region of one of the first region and the second region which is currently being selected with a highlight and the moving includes moving a highlight in word units when the horizontal moving input signal is received from the control device in a state in which the highlight is displayed in a specific word of the first region.

17. The method as claimed in claim 16, wherein, when an input of characters is received in a state in which a specific word of the first region is displayed with the highlight, the replacing includes replacing and displaying the selected specific word with input characters.

18. The method as claimed in claim 16, wherein the moving includes moving the cursor in character units when a selection command is received in a state in which the specific word of the first region is displayed with the highlight.

19. The method as claimed in claim 13, wherein the on-screen keypad comprises a word moving region configured to move the cursor horizontally in word units.

20. The method as claimed in claim 12, wherein the on-screen keypad has a QWERTY keyboard layout.

21. The method as claimed in claim 12, wherein the moving includes moving the cursor in word units when the characters being displayed are more than preset words and moving the cursor in character units when the characters being displayed are less than a preset number of words.

22. A non-transitory computer-readable recording medium having embodied thereon a program for executing a user interface (UI) display method, the UI display method comprising:
    receiving input signals from a control device;
    displaying a sentence comprising a plurality of words corresponding to the received input signal;

moving a cursor in word units if it is determined that a received input signal is a horizontal moving input signal; and replacing a word where the cursor is located with input characters if it is determined that the received input signal is a character input signal.

\* \* \* \* \*